United States Patent
Vandichalrajan

(10) Patent No.: US 9,635,392 B2
(45) Date of Patent: Apr. 25, 2017

(54) METHOD AND SYSTEM FOR DISPLAYING INFORMATION

(71) Applicant: SONY CORPORATION, Tokyo (JP)

(72) Inventor: Abhilash Vandichalrajan, Bangalore (IN)

(73) Assignee: SONY CORPORATION, Tokyo (JP)

(*) Notice: Subject to any disclaimer, the term of this patent is extended or adjusted under 35 U.S.C. 154(b) by 94 days.

(21) Appl. No.: 14/254,442

(22) Filed: Apr. 16, 2014

(65) Prior Publication Data

US 2015/0304727 A1 Oct. 22, 2015

(51) Int. Cl.
| | |
|---|---|
| *G06F 13/00* | (2006.01) |
| *H04N 21/2343* | (2011.01) |
| *H04N 21/236* | (2011.01) |
| *H04N 21/258* | (2011.01) |
| *H04N 21/4415* | (2011.01) |
| *H04N 21/482* | (2011.01) |
| *H04N 21/488* | (2011.01) |
| *H04N 21/422* | (2011.01) |

(52) U.S. Cl.
CPC ... *H04N 21/2343* (2013.01); *H04N 21/23614* (2013.01); *H04N 21/25891* (2013.01); *H04N 21/4415* (2013.01); *H04N 21/482* (2013.01); *H04N 21/4884* (2013.01); *H04N 21/42201* (2013.01)

(58) Field of Classification Search
None
See application file for complete search history.

(56) References Cited

U.S. PATENT DOCUMENTS

| | | | |
|---|---|---|---|
| 7,571,455 B2 * | 8/2009 | Lee | H04N 5/4401 348/486 |
| 8,065,134 B2 | 11/2011 | Naito et al. | |
| 8,621,505 B2 * | 12/2013 | Petronelli | H04N 5/44513 348/465 |
| 2006/0224438 A1 | 10/2006 | Obuchi et al. | |
| 2006/0227240 A1 * | 10/2006 | Chiu | H04N 5/44513 348/383 |
| 2014/0046661 A1 * | 2/2014 | Bruner | H04N 21/4884 704/235 |
| 2014/0053223 A1 * | 2/2014 | Vorobyov | G10L 13/00 725/110 |

* cited by examiner

*Primary Examiner* — Nathan Flynn
*Assistant Examiner* — Christine Kurien
(74) *Attorney, Agent, or Firm* — Chip Law Group

(57) ABSTRACT

Various aspects of a method and a system for displaying information are disclosed herein. The method includes detecting one or more viewers, associated with an electronic device. The method further includes receiving metadata associated with a current channel being viewed on the electronic device by the detected one or more viewers. The received metadata is dynamically translated from a first language to one or more other languages based on the detected one or more viewers.

19 Claims, 5 Drawing Sheets

METHOD AND SYSTEM FOR DISPLAYING INFORMATION

FIELD

Various embodiments of the disclosure relate to displaying information. More specifically, various embodiments of the disclosure relate to displaying information on an electronic device in one or more languages, based on detection of one or more viewers.

BACKGROUND

Conventional devices, such as a television (TV), are operable to display metadata (such as an electronic program guide (EPG) information), associated with a current channel viewed by a user. Generally, the EPG information is displayed on the TV in a single language for multiple viewers. The language in which the EPG information is displayed is pre-determined by a television service provider that streams the current channel. In certain scenarios, the language of the EPG information may be translated to another language using a translation software, and displayed on the TV. However, all the viewers may not be able to read and understand the EPG information in the pre-determined language or the translated language due to different native languages and/or language preferences.

Further limitations and disadvantages of conventional and traditional approaches will become apparent to one of skill in the art, through comparison of described systems with some aspects of the present disclosure, as set forth in the remainder of the present application with reference to the drawings.

SUMMARY

A method and system are provided for displaying information substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
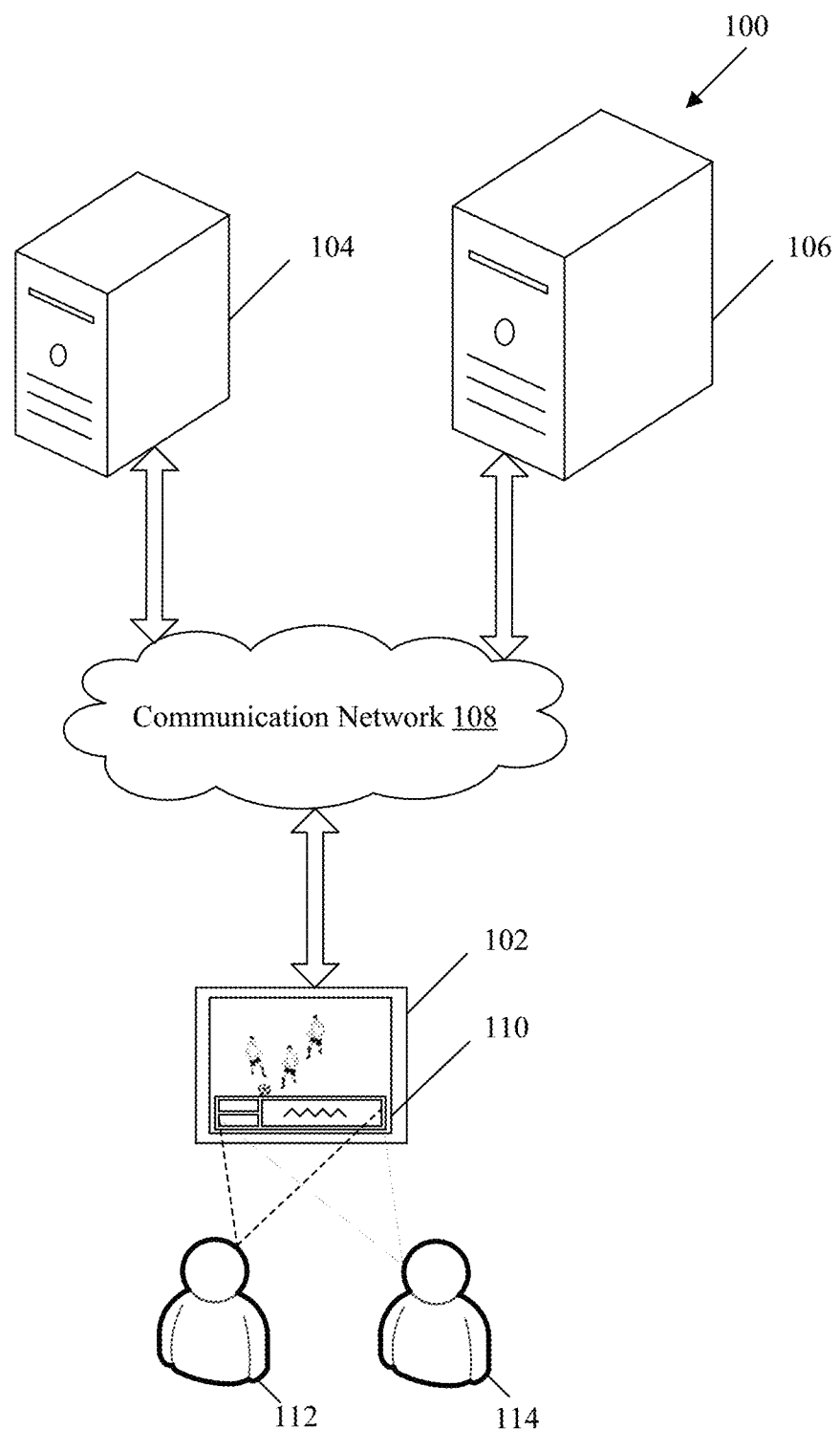
FIG. 1 is a block diagram illustrating a network environment for displaying information, in accordance with an embodiment of the disclosure.

The following described implementations may be found in a method and a system for displaying information. Exemplary aspects of the disclosure may comprise a method that comprises a detection of one or more viewers. Metadata, associated with a current channel viewed by the detected one or more viewers, may be received. The received metadata may be dynamically translated from a first language to one or more other languages based on the detected one or more viewers.

In an embodiment, the received metadata may comprise one or more of electronic program guide (EPG) information, advertisement information, subtitle information, and/or closed caption information. In an embodiment, the metadata may be displayed in the first language in a predetermined region of a display for a first time period. In an embodiment, the translated metadata may be displayed in each of the one or more other languages in the predetermined region of the display for a second time period.

In an embodiment, the metadata in the first language for the first time period, may be alternatively displayed with the translated metadata in each of the one or more other languages for the second time period. Such an alternative display of the metadata in the first language and the translated metadata in each of the one or more other languages, may be displayed in the predetermined region of the screen.

In an embodiment, the metadata in the first language, may be simultaneously displayed with the translated metadata in each of the one or more other languages. Such a simultaneous display of the metadata in the first language and the translated metadata in each of the one or more other languages, may be displayed in a plurality of predetermined regions of the screen.

In an embodiment, the first language may be determined based on a geographical location of the electronic device. In an embodiment, at least one of the one or more other languages may be determined based on the geographical location of the electronic device.

In an embodiment, the one or more other languages that correspond to each of the detected one or more viewers, may be determined based on a manual selection by the detected one or more viewers. In another embodiment, the one or more other languages may be determined based on a user profile of each of the detected one or more viewers.

In an embodiment, the user profile of each of the detected one or more viewers may be determined based on a face recognition, a speech recognition, and/or a proximity detection of one or more other electronic devices associated with the one or more viewers. In another embodiment, one of the one or more other languages for a new non-registered viewer may be determined, based on a manual selection of a corresponding desired language by the new non-registered user. In an embodiment, an audio output may be generated based on a text-to-speech conversion and speech generation of the received metadata in the first language and/or the translated metadata in each of the one or more other languages.

FIG. 1 is a block diagram illustrating a network environment 100 for displaying information, in accordance with an embodiment of the disclosure. With reference to FIG. 1, there is shown an electronic device 102, a server 104, a database server 106, and a communication network 108. The electronic device 102 may be communicatively coupled with the server 104 and the database server 106, via the communication network 108. The electronic device 102 may include a display screen 110. The electronic device 102 may be associated with one or more viewers, such as a viewer 112 and a viewer 114.

The electronic device 102 may comprise suitable logic, circuitry, interfaces, and/or code that may be operable to receive multimedia content, such as web content and/or TV signals. The electronic device 102 may be operable to render the received web content on the display screen 110. In an embodiment, the electronic device 102 may receive web content from the server 104, and render the online data on the display screen 110. In an embodiment, the electronic device 102 may receive television (TV) signals from a network operator (not shown), decode the TV signals, and render the decoded TV signals on the display screen 110. Examples of the electronic device 102 may include, but are not limited to, a television, an Internet Protocol Television (IPTV), a laptop, a tablet computer, a smartphone, and/or a Personal Digital Assistant (PDA) devices.

The server 104 may comprise suitable logic, circuitry, interfaces, and/or code that may be operable to host web content for one or more subscribed devices, such as the electronic device 102. In an embodiment, the server 104 may be communicatively coupled with a network operator configured to send TV signals to the electronic device 102 that may be viewed by the one or more viewers. The network operator may be configured to stream one or more channels to the electronic device 102. The network operator may be further operable to stream metadata, such as electronic program guide (EPG) information, associated with the streamed one or more channels. Examples of the network operator may include, but are not limited to, a local network television station, a cable television service provider, a multi-system operator (MSO), a terrestrial provider, a satellite TV provider, and/or an Internet service provider.

The database server 106 may comprise suitable logic, circuitry, interfaces, and/or code that may be operable to store one or more user profiles of the one or more viewers, such as the viewer 112 and the viewer 114. Such one or more viewers may be registered with the electronic device 102. The electronic device 102 may be a subscribed device, registered with the database server 106. The database server 106 may be implemented using several technologies that are well known to those skilled in the art.

The communication network 108 may include a medium through which the electronic device 102 may communicate with another electronic device (not shown), and one or more servers, such as the server 104 and the database server 106. Examples of the communication network 108 may include, but are not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN). Various devices in the network environment 100 may be operable to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

The display screen 110 may comprise suitable logic, circuitry, interfaces, and/or code that may be operable to render the received multimedia content, for the one or more viewers. The display screen 110 may be further operable to render one or more features and/or applications of the electronic device 102. The display screen 110 may be further operable to receive an input from the one or more viewers, via a touch-sensitive screen. Such an input may be received from the one or more viewers by means of a virtual keypad, a stylus, a touch-based input, and/or a gesture. The display screen 110 may be realized through several known technologies such as, but not limited to, Liquid Crystal Display (LCD) display, Light Emitting Diode (LED) display, Organic LED (OLED) display technology, and/or the like.

In operation, the electronic device 102 may be operable to detect the one or more viewers, such as the viewer 112 and the viewer 114, associated with the electronic device 102. The electronic device 102 may be operable detect such one or more viewers, based on user profiles stored in the database server 106. In an embodiment, the user profiles of each of the detected viewers 112 and 114, may be determined based on a face recognition, a speech recognition, and/or a proximity detection of one or more other electronic devices (such as a geographical position system (GPS) enabled smartphone) associated with the viewers 112 and 114. In an embodiment, the user profile of at least one of the viewers 112 and 114 may be determined based on registration details, such as login credentials, that correspond to at least one of the viewers 112 and 114.

The electronic device 102 may be further operable to receive multimedia content and associated metadata from the server 104, via the communication network 108. In an embodiment, the multimedia content may be an online web-based data received from the server 104. In an embodiment, the multimedia content may be TV signals, received from the network operator, associated with the server 104.

The electronic device 102 may be further operable to dynamically translate the received metadata from a first language to one or more other languages based on the detected one or more viewers. In an embodiment, the electronic device 102 may determine the first language based on a geographical location of the electronic device 102.

In an embodiment, the electronic device 102 may determine at least one of the one or more other languages based on the geographical location of the electronic device 102. In another embodiment, the electronic device 102 may determine the one or more other languages corresponding to each of the detected viewers 112 and 114, based on a manual selection by the detected viewers 112 and 114. In another embodiment, the electronic device 102 may determine the one or more other languages based on a user profile of each of the detected viewers 112 and 114.

In an embodiment, the electronic device 102 may display the metadata in the first language for a first time period in a predetermined region of display screen 110. In an embodiment, the electronic device 102 may display the translated metadata in each of the one or more other languages for a second time period in the predetermined region of display screen 110.

In an embodiment, the electronic device 102 may alternatively display the metadata in the first language for the first time period and the translated metadata in each of the one or more other languages for the second time period. In another embodiment, the electronic device 102 may simultaneously display the metadata in the first language for the first time period and the translated metadata in each of the one or more other languages for the second time period. In an embodiment, the first time period and the second time period may be selected by the detected viewers 112 and 114.

Figure 2:
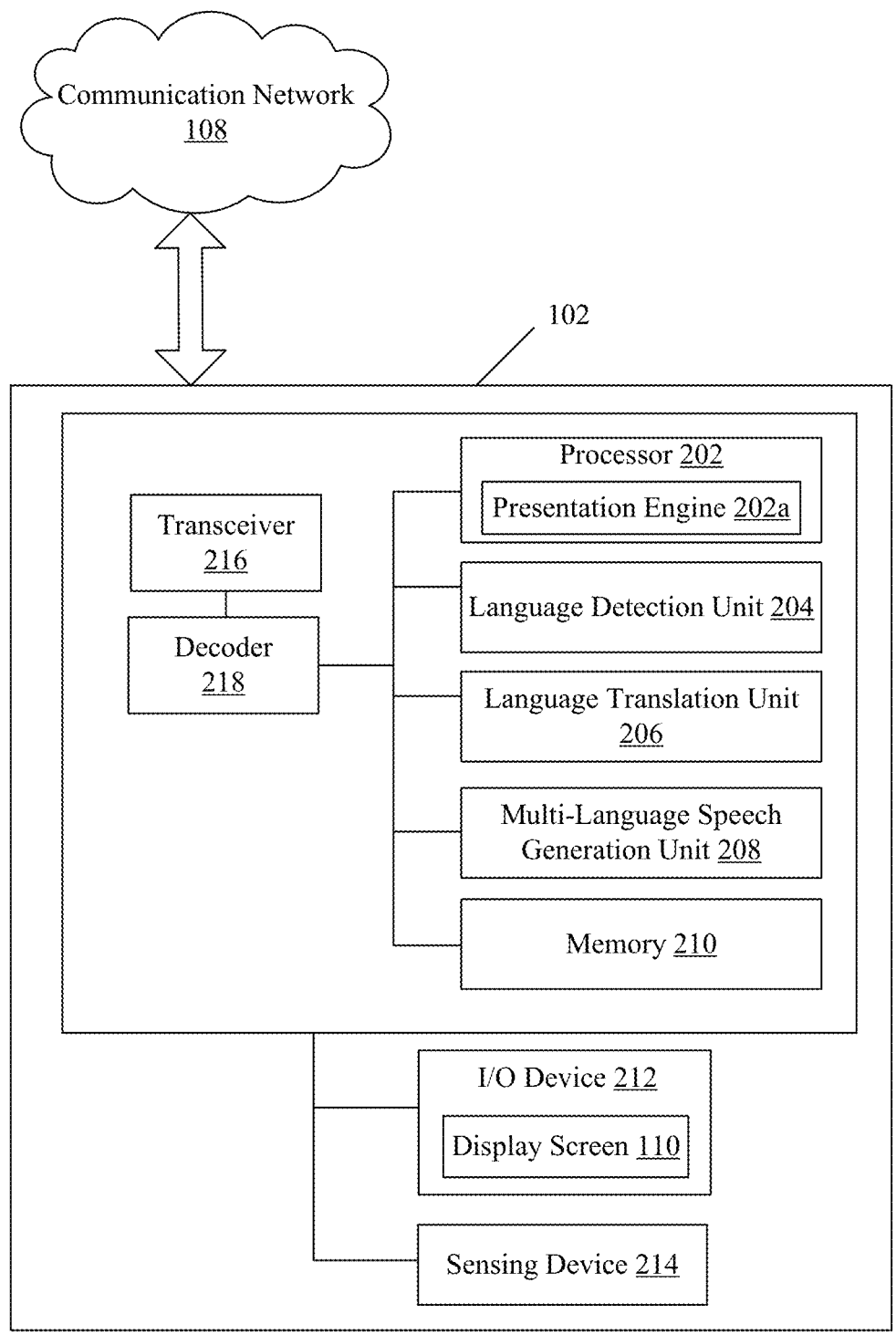
FIG. 2 is a block diagram illustrating an exemplary device, in accordance with an embodiment of the disclosure.

FIG. 2 is a block diagram illustrating an exemplary electronic device, in accordance with an embodiment of the disclosure. With reference to FIG. 2, there is shown the electronic device 102. The electronic device 102 may comprise one or more processors, such as a processor 202, a language detection unit 204, a language translation unit 206, a multi-language speech generation unit 208, and a memory 210. The electronic device 102 may further comprise one or more input/output (I/O) devices, such as an I/O device 212, and one or more sensing devices, such as a sensing device 214. The electronic device 102 may further comprise a transceiver 216, and a decoder 218. The processor 202 may be connected to the language detection unit 204, the language translation unit 206, the multi-language speech generation unit 208, the memory 210, the I/O device 212, and the sensing device 214. The electronic device 102 may further include a transceiver 216 operable to communicate with the one or more servers and/or devices, via the communication network 108. The transceiver 216 may be further connected to the processor 202 via a decoder 218.

The processor 202 may comprise suitable logic, circuitry, interfaces, and/or code that may be operable to execute a set of instructions stored in the memory 210. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The language detection unit 204 may comprise suitable logic, circuitry, interfaces, and/or code that may be operable to determine the first language of the metadata and the one or more other languages for the translation of metadata. The language detection unit 204 may be operable to determine the first language and the one or more other languages, based on the user profiles of the viewers 112 and 114 stored in the memory 210. In an embodiment, the language detection unit 204 may be associated with the sensing device 214, such as a speaker, to determine the first language and the one or more other languages based on speech recognition.

The language translation unit 206 may comprise suitable logic, circuitry, interfaces, and/or code that may be operable to dynamically translate the received metadata from the first language to the one or more other languages. Such a dynamic translation may be based on the detection of the viewers 112 and 114. The language translation unit 206 may be operable to access the memory 210 for one or more language scripts that correspond to the one or more other languages, required for language translation. The language translation unit 206 may comprise a plurality of application programs, such as Babylon10®, to dynamically translate the received metadata from the first language to the one or more other languages. Notwithstanding, the disclosure may not be so limited and other language translation programs may be utilized without limiting the scope of the disclosure.

The multi-language speech generation unit 208 may comprise suitable logic, circuitry, interfaces, and/or code that may be operable to dynamically perform text-to-speech conversion of the metadata in the first language and the one or more other languages. The multi-language speech generation unit 208 may be operable to access the memory 210 for one or more text-to-speech conversion algorithms and one or more speech generation algorithms to generate an audio output. The generated audio output may be played by an output device, such as a speaker. Notwithstanding, the disclosure may not be so limited and other text-to-speech conversion algorithms and speech generation algorithms may be utilized to generate the audio output without limiting the scope of the disclosure.

The memory 210 may comprise suitable logic, circuitry, and/or interfaces that may be operable to store a machine code and/or a computer program having at least one code section executable by the processor 202. The memory 210 may further be operable to store one or more passkeys (configured to operate as a system administrator for a viewer), one or more user profiles (such as a user profile of the viewers 112 and 114), one or more text-to-speech conversion algorithms, one or more speech generation algorithms, and/or other data. Examples of implementation of the memory 210 may include, but are not limited to, Random Access Memory (RAM), Read Only Memory (ROM), Hard Disk Drive (HDD), and/or a Secure Digital (SD) card.

The I/O device 212 may comprise suitable logic, circuitry, interfaces, and/or code that may be operable to receive an input from the viewer, or provide an output to the viewer. The I/O device 212 may comprise various input and output devices that may be operable to communicate with the processor 202. Examples of the input devices may include, but are not limited to, a keyboard, a mouse, a joystick, a touch screen, a microphone, a camera, a motion sensor, a light sensor, and/or a docking station. Examples of the output devices may include, but are not limited to, the display screen 110, and/or a speaker.

The sensing device 214 may comprise suitable logic, circuitry, and/or interfaces that may be operable to store a machine code and/or a computer program having at least one code section executable by the processor 202. The sensing device 214 may comprise one or more sensors to confirm recognition, identification and/or verification of a viewer. The one or more sensors may comprise a camera to detect at least one of a fingerprint, palm geometry, a two-dimensional or three-dimensional facial profile, characteristic features of the iris, and/or a retinal scan of the viewer. The one or more sensors may further include a thermal camera to capture thermal radiation (or thermogram) of the viewer, and a microphone to detect a voice pattern of the viewer. The one or more sensors may comprise capacitive touch sensors to detect one or more touch-based input actions received from the viewer, via the display screen 110.

The sensing device 214 may implement various known algorithms for viewer recognition, viewer identification and/or viewer verification. Examples of such algorithms include, but are not limited to, algorithms for face recognition, voice recognition, iris recognition, password matching, proximity detection based on a GPS enabled another electronic device associated with the viewer, and/or fingerprint matching. It would be appreciated by those skilled in the art that any unique characteristic of the viewer may be accepted as a user input for identification purposes without limiting the scope of the disclosure.

The transceiver 216 may comprise suitable logic, circuitry, interfaces, and/or code that may be operable to communicate with the server 104, via the communication network 108. The transceiver 216 may implement known technologies to support wired or wireless communication of the electronic device 102 with the communication network 108. The transceiver 216 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 216 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The decoder 218 may comprise suitable logic, circuitry, interfaces, and/or code that may be operable to decode TV signals, received from a network operator (not shown), via the communication network 108. The decoder 218, such as a digital television adapter (DTA), may enable the viewer 112 to view digital stations in standard digital format or high-definition (HD), based on the hardware configuration of the electronic device 102.

In operation, the transceiver 216 in the electronic device 102 may be operable to receive multimedia content and associated metadata from the server 104, via the communication network 108. In an embodiment, the transceiver may communicate the multimedia content and the associated metadata to the processor 202.

In an embodiment, the transceiver 216 may be operable to receive TV signals and associated metadata from a network operator associated with the server 104, via the communication network 108. In an embodiment, the transceiver 216 may communicate the received TV channel signals and the associated metadata to the decoder 218. The decoder 218 may decode the received TV channel signals and the associated metadata, and transmit the decoded TV channel signals and the associated metadata to the processor 202. The processor 202 may include a presentation engine 202a that renders the decoded TV channel signals and the associated metadata on the display screen 110.

In an embodiment, the metadata may comprise one or more of electronic program guide (EPG) information, advertisement information, subtitle information, closed caption information, and/or the like. In an embodiment, the one or more metadata, for example, a closed caption information, may be embedded in the TV signals, received by the processor 202. The closed captions may be hidden in a standard data area, such as the line 21 data area, which corresponds to a vertical blanking interval of the TV signal. The closed caption may be visible on the display screen 110, when used with a pre-determined decoder. In an embodiment, the pre-determined decoder may be a separate component, such as the decoder 218, communicatively coupled with the processor 202. In an embodiment, the pre-determined decoder may be an in-built component, integrated with the processor 202 of the electronic device 102.

In an embodiment, the processor 202 may be operable to render the metadata on the display screen 110 in a first language. In an embodiment, the first language may be a default language based on a geographical location of the electronic device 102. In such an embodiment, the processor 202 may be operable to receive the geographical location of the electronic device 102 from the 214, such as a geographical position system (GPS). In an embodiment, the processor 202 may be operable to receive the geographical location of another electronic device, such as a GPS enabled smartphone, associated with the viewer 112. Based on the geographical location, the language detection unit 204 may be operable to determine the first language. For example, the sensing device 214 may determine the location of the electronic device 102 as Chicago, USA. Based on the determined location, the processor 202 may be operable to determine 'English', as the first language. Thus, the metadata may be rendered on the display screen 110 in English language.

In an embodiment, the first language may be pre-specified by one of the one or more viewers, such as the viewer 112, based on a manual selection. Such manual selection may be performed, via a button-press input, a touch-based input and/or a touchless input (such as gestures).

The sensing device 214 may be operable to detect the one or more viewers, such as the viewers 112 and 114, based on biometric data. The sensing device 214 may be configured to receive a touch-based input, a touch-less input and/or a voice-based input, from the viewers 112 and 114. In an embodiment, the sensing device 214 may include an optical sensor to detect retrieved biometric data of the viewers 112 and 114, for example, two-dimensional or three-dimensional facial expressions, characteristic features of the retina, and characteristic features of the iris. In an embodiment, the sensing device 214 may include a microphone to detect a voice pattern of the viewers 112 and 114. The sensing device 214 may implement various known biometric algorithms to retrieve one or more biometric parameters, associated with the viewers 112 and 114. Examples of such biometric algorithms may include, but are not limited to, algorithms for face recognition, voice recognition, retina recognition, thermograms, and/or iris recognition. It will be appreciated by those skilled in the art that any unique characteristic of the user may be accepted as a biometric input without limiting the scope of the disclosure.

Based on the retrieved one or more biometric parameters of the viewers 112 and 114, the processor 202 may determine the user profiles of the viewers 112 and 114, from a pre-stored set of user profiles. Each user profile of the respective viewer may comprise viewer data, such as name, place of birth, preferred language, favorite channels, and/or the like.

In an embodiment, the processor 202 may access the pre-stored set of user profiles stored in the memory 210, to determine the user profiles of the viewers 112 and 114. In an embodiment, the processor 202 may access the pre-stored set of user profiles stored in the database server 106, to determine the user profiles of the viewers 112 and 114. In an embodiment, the language detection unit 204 may be operable to determine one or more other languages associated with the viewers 112 and 114, based on the user profiles determined for the viewers 112 and 114.

In an embodiment, the language detection unit 204 may be operable to determine one of the one or more other languages, based on the geographical location of the electronic device 102. In such an embodiment, the processor 202 may be operable to receive the geographical location of the electronic device 102 from the sensing device 214, such as GPS. Based on the geographical location, the language detection unit 204 may be operable to determine one of the one or more other languages.

In an embodiment, the language detection unit 204 may be operable to determine the one or more other languages that correspond to each of the viewers 112 and 114, based on a manual selection by the viewers 112 and 114. Such manual selection may be performed, via a button-press input, a touch-based input and/or a touchless input (such as gestures).

In an embodiment, the language detection unit 204 may be operable to determine one of the one or more other languages for a new non-registered viewer (not shown) based on a manual selection by the new or non-registered user. Such manual selection by the new or non-registered viewer may be performed, via a button-press input, a touch-based input and/or a touchless input (such as gestures).

Based on the one or more other languages determined by the language detection unit 204, the language translation unit 206 may be operable to dynamically translate the received metadata from a first language to the one or more other languages. In an embodiment, the multi-language speech generation unit 208, may be operable to access the memory 210 for one or more text-to-speech conversion algorithms and one or more speech generation algorithms to generate an audio output. The generated audio output that corresponds to the first language and/or one or more other languages, may be played by the speaker in a pre-determined sequence. The pre-determined sequence may be based on a manual selection performed by one or both of the viewers 112 and 114. In an embodiment, the generated audio output may be played by the output device, such as a speaker, while the received metadata in the respective languages is rendered on the display screen 110. In an embodiment, the generated audio output may be played when the processor 202 receives a button-press input, a touch-based input and/or a touchless input (such as gestures) from one of the viewers 112 and 114.

In an embodiment, the processor 202 may render the metadata in the first language for a first time period, such as 15 seconds, in a predetermined region of display screen 110. In an embodiment, the processor 202 may render the translated metadata in each of the one or more other languages for a second time period, such as 20 seconds, in the predetermined region of display screen 110.

In an embodiment, the processor 202 may alternatively render the metadata in the first language for 15 seconds, and the translated metadata in each of the one or more other languages for 20 seconds. In another embodiment, the processor 202 may simultaneously render the metadata in the first language for 15 seconds, and the translated metadata in each of the one or more other languages for 20 seconds on the display screen 110. In an embodiment, the first time period and/or the second time period may be selected by one or both of the viewers 112 and 114. In another embodiment, the translated metadata may be rendered in the one or more other languages, in a sequence that is determined based on a manual selection performed by one or both of the viewers 112 and 114. Such a manual selection may be performed, via a button-press input, a touch-based input and/or a touchless input (such as gestures).

Figure 3A:
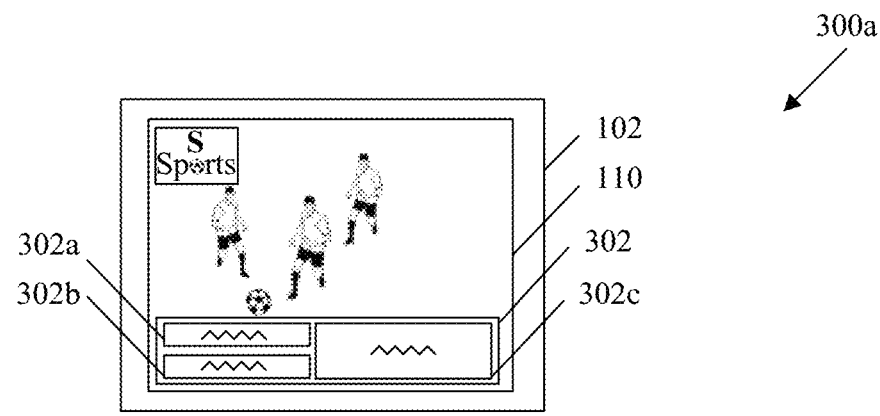
FIGS. 3A and 3B illustrate a first exemplary scenario for implementing the disclosed method and system, in accordance with an embodiment of the disclosure.
Figure 3B:
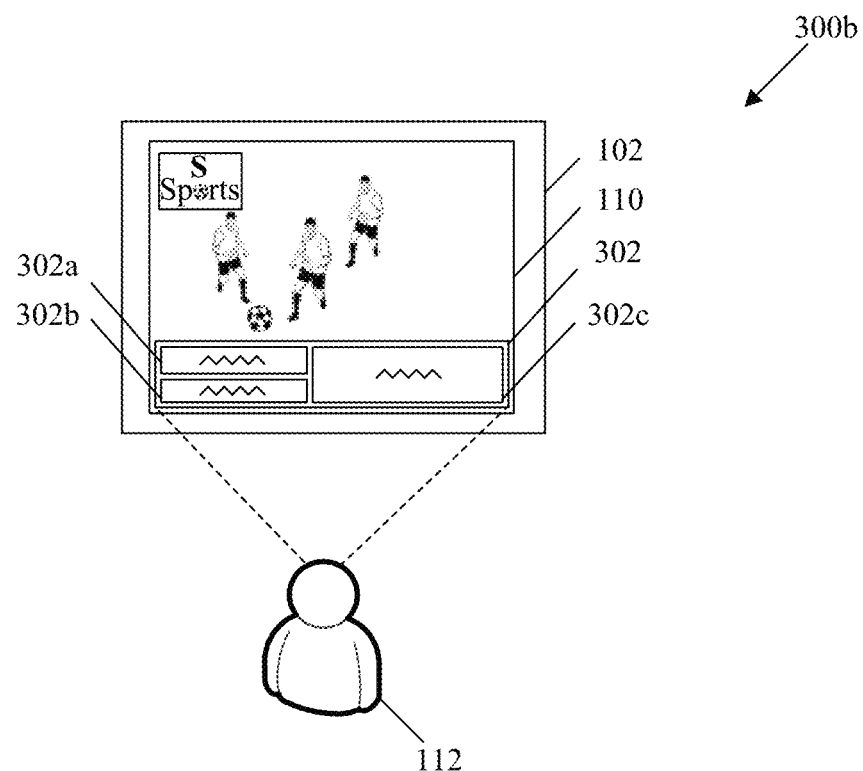

FIGS. 3A and 3B are respective diagrams 300*a* and 300*b*, illustrating a first exemplary scenario for displaying information, in accordance with an embodiment of the disclosure. FIGS. 3A and 3B are described in conjunction with elements of FIG. 1 and FIG. 2.

With reference to FIG. 3A, there is shown an exemplary electronic device 102 operable to render a soccer match on a sports program channel, such as 'S Sports'. The metadata associated with the soccer match may be rendered as an electronic program guide (EPG) information 302, on the display screen 110 of the electronic device 102. The EPG information 302 may include a first sub-region 302*a*, a second sub-region 302*b*, and a third sub-region 302*c*.

In the first exemplary scenario, the electronic device 102 may be located in Chicago. Thus, the language detection unit 204, in association with the sensing device 214, may determine 'English Language' as the first language of the metadata. The metadata may be rendered in the English language on the display screen 110 of the electronic device 102.

The first sub-region 302*a* may display time related data, associated with the soccer match being streamed by the server 104. For example, for the soccer match viewed by the viewer 112, "Time: 9AM-11AM" may be displayed in the first sub-region 302*a*. The second sub-region 302*b* may display genre of the program channel. For example, for the soccer match being streamed by the server 104, "Sports" may be displayed in the second sub-region 302*b*. The third sub-region 302*c* may display additional information associated with the program channel, such as "Group I Match between Team A and Team B".

With reference to FIG. 3B, a viewer 112 may be associated with the electronic device 102. The processor 202 may detect the viewer 112 based on one or more biometric parameters captured by the sensing device 214. The one or more biometric parameters may correspond to face recognition, voice recognition, and/or iris recognition of the viewer 112.

In instances where the electronic device 102 is located in a city, such as Chicago, as explained in FIG. 3A, the language detection unit 204 may determine 'English Language' as the first language of the metadata. In instances where the electronic device 102 is relocated to another city, such as Tokyo, the language detection unit 204 may determine 'Japanese Language' as the first language of the metadata. In such instances, the Japanese language may be determined based on the geographical location detected by the sensing device 214.

In instances where the electronic device 102 is located in Chicago, the metadata may be rendered in the English language on the display screen 110 of the electronic device 102. The processor 202 may determine a first user profile of the detected viewer 112 from a pre-stored set of user profiles. In an embodiment, the pre-stored set of user profiles may be stored in a secondary storage device or an external storage device associated with the memory 210. In another embodiment, the pre-stored set of user profiles may be stored in the database server 106. Based on the determined user profile, the language detection unit 204 may determine a second language, such as Spanish language, associated with the viewer 112.

In response to the determined second language, the language translation unit 206 may translate the metadata from the English language to the Spanish language. The processor 202 may display the metadata in the Spanish language in the first sub-region 302*a*, the second sub-region 302*b* and the third sub-region 302*c* in the EPG information 302 rendered on the display screen 110.

In an embodiment, the processor 202 may be operable to display the metadata in the Spanish language in a predetermined region, for example a bottom edge region of the display screen 110 for a predetermined time duration, such as 15 seconds. In an embodiment, the predetermined time duration may be pre-configured by the viewer 112, via a remote control of the electronic device 102.

In an embodiment, the processor 202 may be operable to display the metadata in the Spanish language in the predetermined region of the display screen 110 for a time duration for which a predetermined button press operation is performed. Such button press operation may correspond to the remote control of the electronic device 102 or a hardware button on the electronic device 102.

In an embodiment, the processor 202 may be operable to render the metadata for a predetermined time duration for a predetermined time slot during the day. For example, the processor 202 may render the metadata, such as a closed caption, on the display screen 110 daily for two hours from 9AM-11AM in Spanish language. The Spanish language may be determined by the language detection unit 204 based on speech recognition of the viewer 112.

In an embodiment, the predetermined time duration and predetermined time slot may be manually configured by the viewer 112. In an embodiment, the predetermined time duration and predetermined time slot may be automatically configured by the processor 202, based on detection of the viewer 112.

Figure 4A:
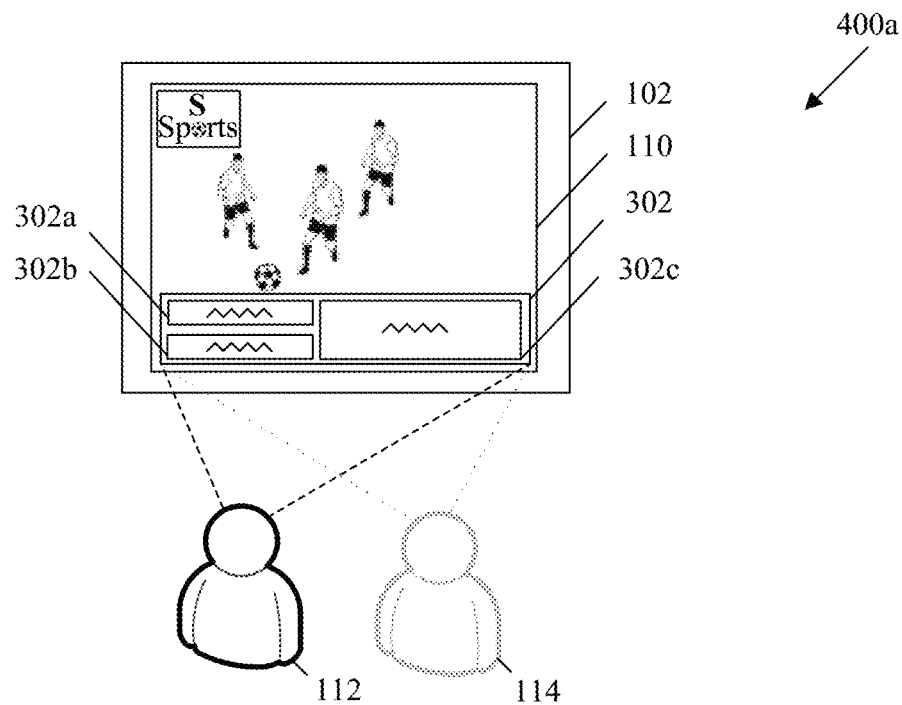
FIGS. 4A and 4B illustrate a second exemplary scenario for implementing the disclosed method and system, in accordance with an embodiment of the disclosure.
Figure 4B:
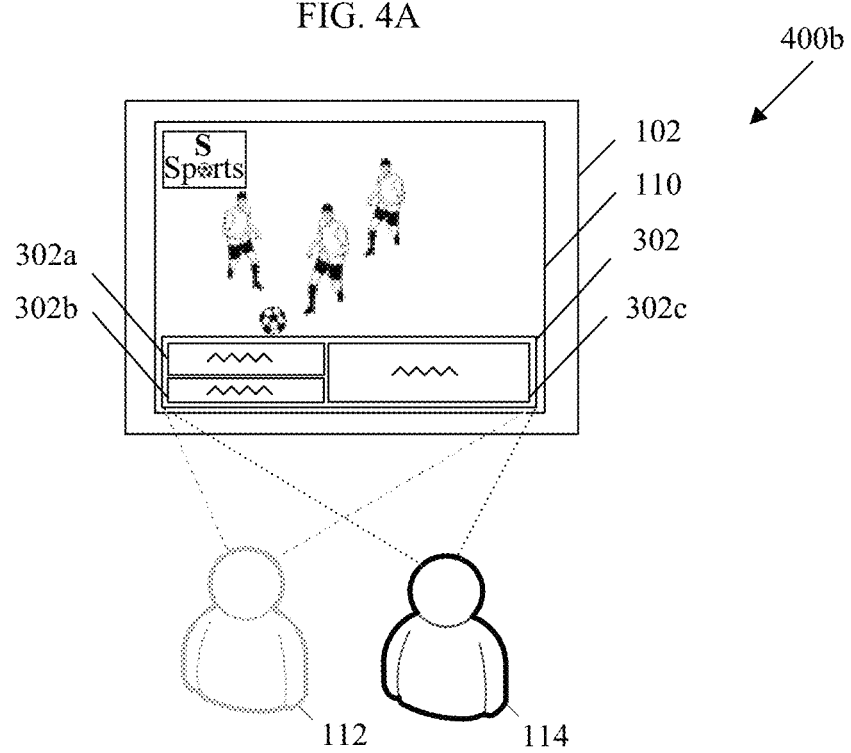

FIGS. 4A and 4B are respective diagrams 400a and 400b, illustrating a second exemplary scenario for displaying information, in accordance with an embodiment of the disclosure. FIGS. 4A and 4B are described in conjunction with elements of FIG. 1, FIG. 2, and FIG. 3.

With reference to FIG. 4A, there is shown the electronic device 102 operable to render the soccer match on the 'S Sports' sports program channel. Metadata, associated with the soccer match, may be displayed as the EPG information 302 in a first language, such as English.

In the second exemplary scenario, as illustrated in FIG. 4A, a viewer 112 and a viewer 114 may be associated with the electronic device 102. The sensing device 214 may receive one or more biometric parameters of the viewers 112 and 114. The one or more biometric parameters may correspond to face detection/recognition, voice recognition, and/or iris recognition of the viewers 112 and 114.

Based on the one or more biometric parameters received by the sensing device 214, the processor 202 may determine a first user profile of the viewer 112 and a second user profile of the viewer 114. The processor 202 may determine the first user profile of the viewer 112 and the second user profile of the viewer 114 from a pre-stored set of user profiles. In an embodiment, the pre-stored set of user profiles may be stored in a secondary storage device or an external storage device associated with the memory 210. In another embodiment, the pre-stored set of user profiles may be stored in the database server 106.

Based on the determined first user profile and the second user profile, the language detection unit 204 may determine a second language, 'Spanish language', for the viewer 112. The language detection unit 204 may further determine another second language, 'French language', for the viewer 114.

In response to the determined Spanish and French languages, the language translation unit 206 may translate the metadata from the default English language to the Spanish language for the viewer 112. The language translation unit 206 may further translate the metadata from the default English language to the French language for the viewer 114.

In an embodiment, for the viewer 112, the processor 202 may display the first metadata in the Spanish language in the first sub-region 302a, the second sub-region 302b and the third sub-region 302c, rendered on the display screen 110. In an embodiment, for the viewer 114, the processor 202 may display the second metadata in the French language in the first sub-region 302a, the second sub-region 302b and the third sub-region 302c in the EPG information 302 displayed on the display screen 110.

In an embodiment, the processor 202 may be operable to render the first metadata in the Spanish language in a predetermined region, such as a bottom edge region, of the display screen 110. In an embodiment, the processor 202 may be operable to render the second metadata in the French language in the predetermined region, such as the bottom edge region, of the display screen 110.

In an embodiment, the processor 202 may be operable to display the first metadata in the Spanish language and the second metadata in the French language, alternatively, in the predetermined region for a predetermined time duration. For example, if the predetermined time duration for the first and second metadata is set as 20 seconds, the first metadata may be displayed in the Spanish language for the first 20 seconds and the first metadata may be displayed in the French language for the next 20 seconds, and so on.

With reference to FIG. 4A, the processor 202 may be operable to display the first metadata in the Spanish language for the viewer 112, in the predetermined region for a first predetermined time duration. With reference to FIG. 4B, the processor 202 may be operable to display the second metadata in the French language for the viewer 114, in the predetermined region for a second predetermined time duration. In an embodiment, the processor 202 may be operable to simultaneously render the first metadata in the Spanish language and the second metadata in the French language, in a plurality of predetermined regions on the display screen 110.

Figure 5:
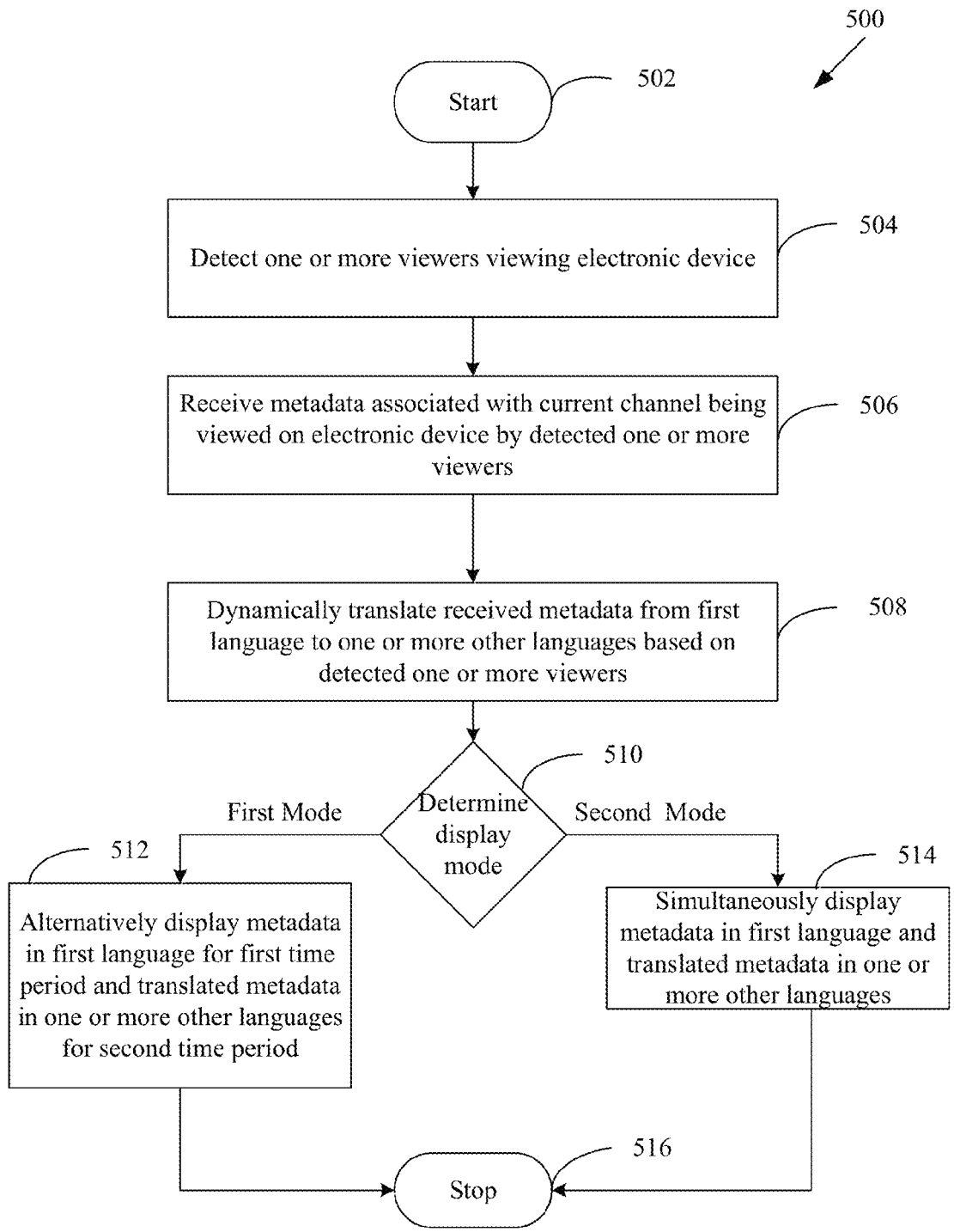
FIG. 5 is a flow chart illustrating a method for displaying information, in accordance with an embodiment of the disclosure.

FIG. 5 is an exemplary flow chart illustrating exemplary steps for displaying information, in accordance with an embodiment of the disclosure. With reference to FIG. 5, there is shown a flow chart 500. The flow chart 500 is described in conjunction with FIGS. 1, 2, 3, and 4. The method starts at step 502 and proceeds to step 504.

At step 504, one or more viewers, such as the viewer 112 and the viewer 114, associated with the electronic device 102, may be detected. At step 506, metadata associated with a current channel viewed by the detected viewers 112 and 114, may be received. At step 508, the received metadata may be dynamically translated from a first language to one or more other languages, based on the detected viewers 112 and 114.

In an embodiment, the first language, and/or at least one of the one or more other languages may be determined, based on a geographical location of the electronic device 102. In an embodiment, the one or more other languages may be determined, based on user profiles of the detected viewers 112 and 114. The user profile of each of the detected viewers 112 and 114 may be determined, based on a face recognition, a speech recognition, and/or a proximity detection of one or more other electronic devices associated with the viewers 112 and 114.

In an embodiment, one of the one or more other languages for a new non-registered viewer may be determined, based on a manual selection of a corresponding desired language in response to a pop-up option generated by the electronic device 102.

At step 510, a display mode to render the information associated with the received metadata, may be determined. In instances where the mode is a first mode, the control passes to step 512.

At step 512, when the display mode is a first mode, the metadata in the first language may be simultaneously rendered with the translated metadata in each of the one or more other languages, in a plurality of predetermined regions of the display screen 110. Control passes to end step 516.

In instances where the display mode is a second mode, the control passes to step 514. At step 514, the metadata in the first language for a first time period may be alternatively renderered with the translated metadata in each of one or more other languages for a second time period, in the predetermined region of the display screen 110. Control passes to end step 516.

In an embodiment, an audio output, based on a text-to-speech conversion of the received metadata in the first language and/or the translated metadata in each of the one or more other languages, may be generated in a pre-determined sequence. In an embodiment the generated audio output may be played by an output device, such as a speaker. In an embodiment, the generated audio output may be played by the output device, such as a speaker, while the received metadata in the respective languages is rendered on the display screen 110. In an embodiment, the generated audio output may be played when the processor 202 receives a button-press input, a touch-based input and/or a touchless input (such as gestures) from one of the viewers 112 and 114.

In accordance with another embodiment of the disclosure, a system for displaying information on the electronic device 102 is disclosed. The electronic device 102 (FIG. 1) may comprise one or more processors (hereinafter referred to as the processor 202 (FIG. 2)). The processor 202 may be operable to detect one or more viewers, such as the viewer 112 and the viewer 114 (FIG. 1). Metadata associated with a current channel may be received by the processor 202. The metadata may be received by the processor 202. The received metadata may be dynamically translated from a first language to one or more other languages based on the detected viewer 112 and the viewer 114.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer for displaying information. The at least one code section in an electronic device may cause the machine and/or computer to perform the steps comprising detecting one or more viewers, receiving metadata associated with a current channel being viewed on the electronic device by the detected one or more viewers, and dynamically translating the received metadata from a first language to one or more other languages based on the detected one or more viewers.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that may include a region of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for displaying information, comprising:
in an electronic device comprising one or more circuits:
detecting, by said one or more circuits, a plurality of viewers viewing said electronic device;
receiving, by said one or more circuits, metadata associated with a current channel being viewed on said electronic device by said detected plurality of viewers;
dynamically translating, by said one or more circuits, said received metadata from a first language to a plurality of languages other than said first language based on said detected plurality of viewers; and
displaying, by said one or more circuits, said received metadata in said first language in a determined region of a display of said electronic device for a first time period and said translated metadata in each of said plurality of languages in said determined region of said display for a second time period, wherein said first time period is equal to or shorter than said second time period.

2. The method according to claim 1, wherein said received metadata comprises one or more of: electronic program guide (EPG) information, advertisement information, subtitle information, or closed caption information.

3. The method according to claim 1, further comprising alternatively displaying, by said one or more circuits, said received metadata in said first language for said first time period and said translated metadata in each of said plurality of languages for said second time period in said determined region of said display.

4. The method according to claim 1, further comprising simultaneously displaying, by said one or more circuits, said received metadata in said first language and said translated metadata in each of said plurality of languages in a plurality of determined regions of said display.

5. The method according to claim 1, further comprising determining, by said one or more circuits, said first language based on a geographical location of said electronic device.

6. The method according to claim 1, further comprising determining, by said one or more circuits, at least one of said plurality of languages based on a geographical location of said electronic device.

7. The method according to claim 1, further comprising determining, by said one or more circuits, said plurality of languages corresponding to each of said detected plurality of viewers based on a manual selection by said detected plurality of viewers.

8. The method according to claim 1, further comprising determining, by said one or more circuits, said plurality of languages based on a user profile of each of said detected plurality of viewers.

9. The method according to claim 8, wherein said user profile of each of said detected plurality of viewers is determined based on at least one of a face recognition, a speech recognition, or a proximity detection of a plurality of electronic devices associated with said plurality of viewers.

10. The method according to claim 1, further comprising determining, by said one or more circuits, one of said plurality of languages for a new non-registered viewer based on a manual selection by said new non-registered user.

11. The method according to claim 1, further comprising generating, by said one or more circuits, an audio output based on a text-to-speech conversion and speech generation of at least said received metadata in said first language or said translated metadata in said each of said plurality of languages.

12. A system for displaying information, comprising:
an electronic device that comprises one or more circuits configured to:
detect a plurality of viewers that view said electronic device;
receive metadata associated with a current channel that is viewed on said electronic device by said detected plurality of viewers;
dynamically translate said received metadata from a first language to a plurality of languages other than said first language based on said detected plurality of viewers; and
display said received metadata in said first language in a determined region of a display of said electronic device for a first time period and said translated metadata in each of said plurality of languages in said determined region of said display for a second time period, wherein said first time period is equal to or shorter than said second time period.

13. The system according to claim 12, wherein said one or more circuits are further configured to alternatively display said received metadata in said first language for said first time period and said translated metadata in each of said plurality of other languages for said second time period in said determined region of said display.

14. The system according to claim 12, wherein said one or more circuits are further configured to determine said first language based on a geographical location of said electronic device.

15. The system according to claim 12, wherein said one or more circuits are further configured to determine at least one of said plurality of languages based on a geographical location of said electronic device.

16. The system according to claim 12, wherein said one or more circuits are further configured to determine said plurality of languages based on a user profile of each of said detected plurality of viewers, wherein said user profile of each of said detected plurality of viewers is determined based on at least one of a face recognition, a speech recognition, or a proximity detection of a plurality of electronic devices associated with said plurality of viewers.

17. A non-transitory computer-readable storage medium having stored thereon a set of computer-executable instructions for causing a computer to perform operations comprising:
detecting a plurality of viewers viewing an electronic device;
receiving metadata associated with a current channel being viewed on said electronic device by said detected plurality of viewers;
dynamically translating said received metadata from a first language to a plurality of languages other than said first language based on said detected plurality of viewers; and
displaying said received metadata in said first language in a determined region of a display of said electronic device for a first time period and said translated metadata in each of said plurality of languages in said determined region of said display for a second time period, wherein said first time period is equal to or shorter than said second time period.

18. The method according to claim 1, further comprising simultaneously displaying, by said one or more circuits, said translated metadata in plurality of languages on said display of said electronic device.

19. The method according to claim 1, further comprising simultaneously displaying, by said one or more circuits, said received metadata in said first language on said display for said first time period and said translated metadata in each of said plurality of languages on said display for said second time period, wherein said first time period is shorter than said second time period.

* * * * *